May 14, 1963 — W. R. BECK — 3,089,579
COMPOSITE FLIGHT
Filed June 8, 1960
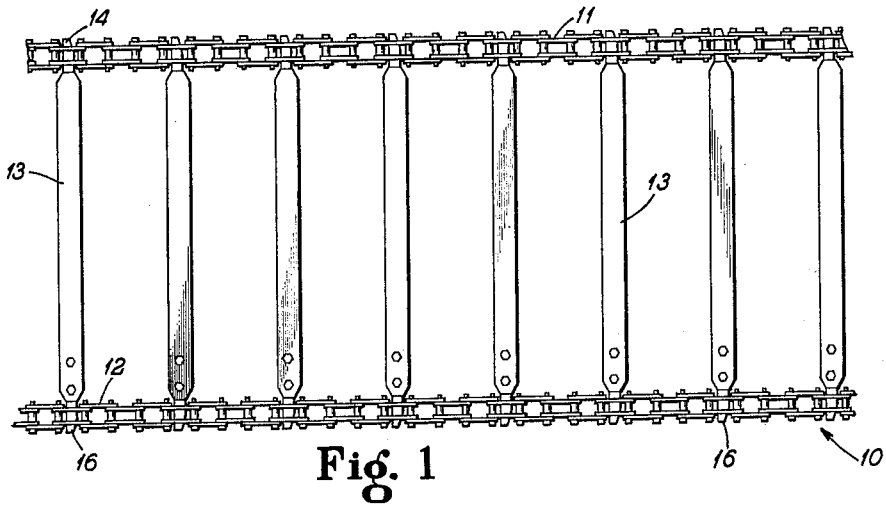
Fig. 1
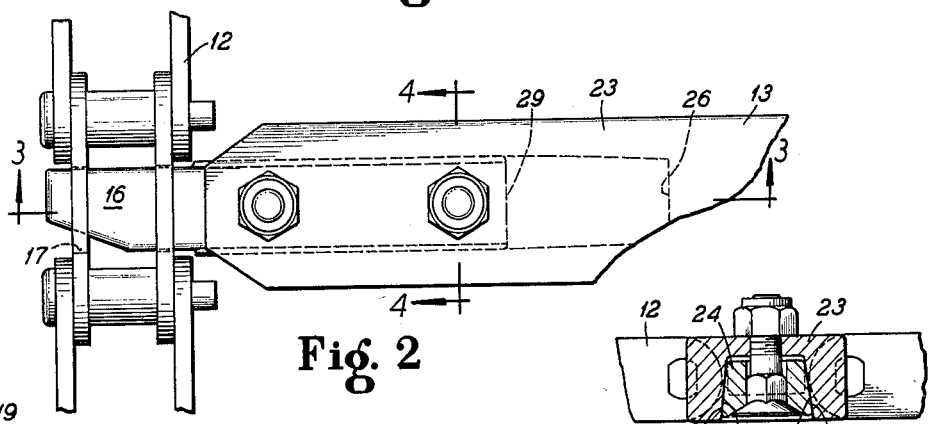
Fig. 2
Fig. 4
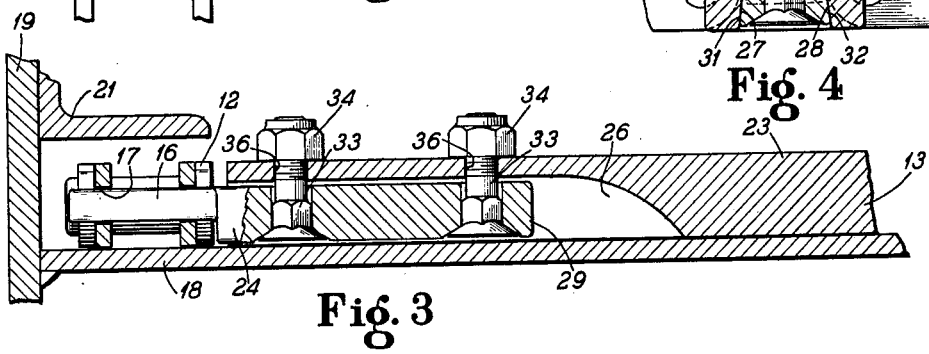
Fig. 3
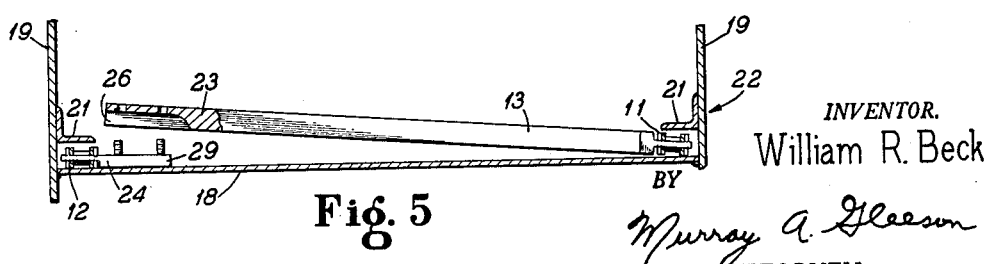
Fig. 5
INVENTOR.
William R. Beck
BY
Murray A. Gleeson
ATTORNEY 3,089,579
COMPOSITE FLIGHT
William R. Beck, Palos Heights, Ill., assignor to Goodman Manufacturing Company, Chicago, Ill., a corporation of Illinois
Filed June 8, 1960, Ser. No. 34,695
3 Claims. (Cl. 198—175)

This invention relates generally to flight conveyors and more particularly to a composite flight for use in a mine shuttle car.

Mine shuttle cars are usually provided with a flight conveyor of the type in which a pair of parallel spaced endless driving chains run in channels along opposite sides of the bottom of the car. Flights extend between these chains, at intervals, having their opposite ends connected to the chains to form a ladder-like configuration. Material carried by the shuttle car rests on this conveyor during transit between the loading point and discharge point. Upon arrival at the discharge point, the conveyor is operated to move the load off the shuttle car into mine cars or conveyors for distant haulage. Occasionally, a portion of the load such as a large rock will become lodged between a flight and the roof or some portion of the car body such that the flight becomes bowed as a result of the chain pull at the flight ends. When this occurs, considerable difficulty is experienced where the flight travels around the end sprocket for return travel beneath the car. When one or more flights become bent or bowed, it has been customary to remove a portion of the chain retaining channel, reduce tension in the chain until it is slack and then raise one of the chains vertically until the bent flight can be disengaged from the chain and a straight flight installed in its place. This necessarily involves unloading the car by hand which consumes considerable time in addition to the time required to loosen the chains and remove the guide channels.

It is a principal object of the present invention to provide a composite flight which can be removed from or installed in the conveyor of a shuttle car without disturbing the chain tension or guide channels and without removing the load except that portion which is above the affected flight.

A further object is to provide an adjustable length flight for socketing engagement with a pair of drive chains spaced a fixed distance apart.

A still further object is to provide a flight having adjustment means between its ends for varying its length.

In the drawing:

FIGURE 1 is a plan view of a portion of the conveying run of a flight conveyor;

FIGURE 2 is a plan view of a flight end showing its connection to one of the driving chains;

FIGURE 3 is a longitudinal section view taken along the line 3—3 of FIG. 2;

FIGURE 4 is a cross section view of the flight taken along the line 4—4 of FIG. 2; and FIGURE 5 is an end view of a flight conveyor showing the flight in position for installation or removal.

Referring now more particularly to the drawing, the reference numeral 10 indicates a flight conveyor of the type used in mine shuttle cars, having a pair of spaced parallel endless driving chains 11, 12 and several elongated composite flights 13 extending between the chains at intervals. Each flight 13 has a pair of opposite end portions 14, 16 which are chain-engageable projections adapted to extend through apertures 17 in certain links of chains 11 and 12.

As shown in FIGURE 3, the chain 12 or 11 slides on a floor 18 of the supporting structure 22 such as a shuttle car, and is guided at the side by side wall 19 and at the top by lip 21. The floor 18, side wall 19, and lip 21 form a guide channel for the chain 12 or 11. Side walls 19, 19 limit the lateral shifting of chains 11 and 12 to prevent disengagement from the flight 13. Lip 21 acts to hold the chain and flights near floor 18 where they might tend to lift away from the floor 18 when the discharge end of the conveyor is inclined for loading over the side of a mine car or belt conveyor.

Flight 13 includes body member 23 and extension member 24 which engage each other to form a rigidly extending structure. Body member 23 has a recess 26 formed in part by converging interior side surfaces 27 and 28. Extension member 24 has a tongue 29 formed in part by converging exterior surfaces 31 and 32. Interior surfaces 27 and 28 of recess 26 are congruent with exterior surfaces 31 and 32 of tongue 29 to provide an interengageable tongue and groove joint.

Connecting means for releasably fastening the tongue and groove joint in interlocking engagement is provided in the form of plow bolts 33, and nuts 34. These bolts 33 extend through registered holes 36 in the body member 23. In the conveying position shown in FIGURE 3, the joint tends to remain engaged as a result of its own weight and in the return position, which is the inverse of FIGURE 3, the plow bolts 33 and nuts 34 prevent disengagement. These plow bolts 33 also provide a means for establishing the working length of the flight by determining the distance between end portions 14 and 16 of flight 13. If desired, one bolt 33 may be engaged with different of holes 36 to provide an adjustable length flight where it is desirable to manufacture one flight for use on different width conveyors.

In operation, the installation of a flight is accomplished by inserting the end portion 16 of extension member 24 through aperture 17 in chain 12 being sure that plow bolt or bolts 33 have their threaded end extending upwardly. End portion 14 of body member 23 is then inserted through a similar aperture in chain 11 and lowered until the proper hole 36 is aligned with one of the plow bolts 33. One or more nuts 34 are then tightened to secure the body member 23 and extension member 24 in interlocking engagement.

In order to remove a flight it is only necessary to remove nuts 34, lift body member 23 off bolts 33 and withdraw it and extension member 24 from chains 11 and 12. Either installation or removal of a flight can be carried out without disturbing the position or tension of the chains and without disturbing any other flight in the conveyor.

While the invention has been shown and described in terms of a preferred embodiment thereof, it will be understood that other constructions and arrangements may be made without departing from the spirit and scope of the claims here appended.

I claim:

1. In a chain and flight conveyor, the combination comprising:
   a conveyor trough having a bottom wall and a pair of spaced sidewalls extending upwardly from the edges of said bottom wall;
   a pair of driving chains, each chain adapted to run along a respective edge of said bottom wall adjacent a respective sidewall, each chain having apertures spaced longitudinally along the inner sides thereof, said apertures in respective of said chains being transversely aligned with each other;
   composite flight means extending transversely across said conveyor having a pair of separable overlapping portions, each portion having a driving connection extending outwardly for engagement with an aperture in respective of said driving chains, one portion having an opened wedge-shaped cavity opposite its driving connection, the other portion having a tongue extending oppositely from its driving connection; and fastening means for securing said tongue in engagement with the sides of said cavity forming a break-away joint connecting said overlapping portions together and arranged so as to open perpendicularly of said flight means.

2. In a chain and flight conveyor, the combination comprising:

a pair of spaced parallel driving chains having side apertures spaced along the length thereof, said apertures in respective of said chains being transversely aligned with each other;

elongated flight means extending between said chains having two laterally separable portions, each portion having a driving connection extending from an end thereof engageable with an aperture in respective of said chains;

one of said portions having a pair of inclined converging surfaces defining a tapered cavity open along the wider base thereof, the other of said portions having a tongue insertable into said cavity through the open base; and releasable fastening means securing said tongue in engagement with the converging surfaces of said one portion.

3. A composite conveyor flight comprising:

an elongated body member having a driving connection extending outwardly from one end thereof and having a pair of laterally spaced inclined converging interior surfaces at the other end thereof defining a tapered recess open along its wider base, an extension member having another driving connection extending therefrom and having a pair of exterior inclined converging surfaces projecting therefrom opposite its driving connection, and connecting means on said body member securing said interior and exterior surfaces in mutual engagement.

References Cited in the file of this patent

UNITED STATES PATENTS

| | | |
|---|---|---|
| 661,607 | Heineke | Nov. 13, 1900 |
| 671,662 | Buswell | Oct. 4, 1910 |
| 2,757,784 | Von Stroh et al. | Aug. 7, 1956 |
| 2,954,864 | Lee et al. | Oct. 4, 1960 |

FOREIGN PATENTS

| | | |
|---|---|---|
| 504,483 | Belgium | July 31, 1951 |
| 507,764 | Belgium | Dec. 31, 1951 |
| 829,878 | Germany | Jan. 31, 1952 |

OTHER REFERENCES

German printed application S 29,620, June 28, 1956.